(12) United States Patent
Martinez Sampedro

(10) Patent No.: US 8,033,085 B2
(45) Date of Patent: Oct. 11, 2011

(54) MACHINE FOR SHAPING, FILLING AND CLOSING EXPANDED POLYMER CONTAINERS

(75) Inventor: Angel Javier Martinez Sampedro, Logrono (ES)

(73) Assignee: IDM World S.L., Logrono, La Rioja (ES)

( * ) Notice: Subject to any disclaimer, the term of this patent is extended or adjusted under 35 U.S.C. 154(b) by 199 days.

(21) Appl. No.: 12/305,519

(22) PCT Filed: Jun. 27, 2006

(86) PCT No.: PCT/ES2006/000375
§ 371 (c)(1),
(2), (4) Date: May 21, 2009

(87) PCT Pub. No.: WO2008/000849
PCT Pub. Date: Jan. 3, 2008

(65) Prior Publication Data
US 2009/0313956 A1 Dec. 24, 2009

(51) Int. Cl.
*B65B 31/00* (2006.01)

(52) U.S. Cl. .......................................... 53/511; 53/512

(58) Field of Classification Search ............... 53/511, 53/512, 510, 141, 329, 348
See application file for complete search history.

(56) References Cited

U.S. PATENT DOCUMENTS

| | | | | |
|---|---|---|---|---|
| 3,669,594 A * | 6/1972 | Brown et al. | | 425/186 |
| 3,808,772 A * | 5/1974 | Turtschan | | 53/141 |
| 5,447,012 A * | 9/1995 | Kovacs et al. | | 53/433 |
| 5,473,867 A * | 12/1995 | Suga | | 53/511 |
| 5,629,060 A * | 5/1997 | Garwood | | 428/35.2 |
| 5,749,203 A * | 5/1998 | McGowan, Jr. | | 53/432 |
| 6,142,763 A | 11/2000 | Lee et al. | | |
| 6,701,695 B1 * | 3/2004 | Douglas | | 53/511 |
| 2005/0258559 A1 | 11/2005 | Johansen et al. | | |

FOREIGN PATENT DOCUMENTS
WO   WO 2005/030471   4/2005

* cited by examiner

*Primary Examiner* — Sameh H. Tawfik
(74) *Attorney, Agent, or Firm* — Merchant & Gould P.C.

(57) ABSTRACT

The invention relates to a machine for shaping, filling and closing expanded polymer containers, comprising a lower unwinder (1) for an expanded polymer web (4), a preheating station (3) for preheating the web, a container thermoforming station (5), a filling area (6) for filling the containers, an upper unwinder (7) for a closing film for closing shaped containers, a container closing station (10), a cutting station (11) and a drag system (12) for dragging the web (4) along the different stations.

6 Claims, 7 Drawing Sheets

MACHINE FOR SHAPING, FILLING AND CLOSING EXPANDED POLYMER CONTAINERS

This application is a National Stage Application of PCT/ES2006/000375, filed 27 Jun. 2006 and which application is incorporated herein by reference. To the extent appropriate, a claim of priority is made to the above disclosed application.

FIELD OF THE INVENTION

The present invention relates to a machine for shaping, filling and closing containers obtained from an expanded polymer web, such as an expanded polystyrene web.

The machine of the invention is designed to continuously obtain shaped containers from an expanded polystyrene web or the like, preferably obtained from a reel, to fill the containers with the product for which they are intended, to hermetically close them, and finally to supply the individual closed containers for their sale. The machine of the invention can further include means for carrying out certain imprints on the closing sheet or film of the container, such as the packaging date, expiration date, etc.

To that end, the machine of the invention comprises a lower reel unwinder supplying the expanded polymer web, a preheating station for preheating this web, a container thermoforming station, a packaging area, an upper unwinder supplying the film for closing the containers, a container closing station and a final cutting station. The machine further includes a drag system for dragging the sheet running throughout the different stations, from the inlet to the preheating station to the outlet of the cutting station. There is a space between the thermoforming the stations and the position in which the upper unwinder and the container closing station are located, which space corresponds to the loading area, an operation which can be carried out manually or automatically.

BACKGROUND OF THE INVENTION

The packaging of different products in expanded polystyrene containers or the like is increasingly frequent, especially for perishable products, due to the preservation conditions which this type of containers can offer. The containers are generally obtained in the form of trays by means of shaping installations and are supplied to the packager, who will carry out the operation of filling and closing the container. This system involves a series of drawbacks, such as the need for the packager to transport and store the containers, having to adapt to beverage containers offered by the container manufacturer, the possibility of contamination of the container from its manufacture to its filling and closing, etc.

To solve this drawback, application PCT WO 2005/030471 describes a machine which allows continuously shaping the container, from an expanded polymer web, filling the container and closing and supplying it for its sale.

The machine is formed by an assembly of reel-carrier axes and an unwinding unit for unwinding the expanded polymer web, a preheating unit for preheating the web, a molding unit in which the containers are shaped, a closing and sealing unit for closing and sealing the containers, printing units, a lengthways cutting unit and another crossways cutting unit. The machine is completed with a drag system for dragging the sheet, which system stops the forward movement of said sheet while the different operations in the different stations are being carried out, and causes the forward movement thereof once these operations have ended.

Although this machine provides for the manufacture of containers, the filling and closing thereof, all of this in a continuous manner, it has certain drawbacks, fundamentally in the constitution and operation of the preheating station, the thermoforming station and the closing station for the containers.

The preheating station does not allow suitable regulation of the preheating temperature according to the speed or rate of movement of the web along the different stations.

The thermoforming station has the risks of unwanted deformations occurring in the wall of the container.

As regards the sealing station, the manner in which this operation is carried out, after the creation of an inert atmosphere inside the container ensuring the preservation of the contained product, is not provided.

With respect to the cutting stations, since two cutting stations, a lengthways cutting station and another crossways cutting station are arranged consecutively, the length of the machine increases the cost thereof.

DESCRIPTION OF THE INVENTION

The object of the present invention is to eliminate the drawbacks set forth by means of a machine of the type indicated, with a simpler constitution allowing safer operation.

In the machine of the invention, the preheating station is formed such that it allows correct regulation of the temperature, both through the number of radiant elements and by the variation in the distance of said elements from the web to be shaped.

On the other hand, the thermoforming station ensures perfect adaptation of the web to the surfaces of the mold and countermold forming part of this station, such that the risk of unwanted deformations occurring is eliminated.

The preservation conditions of the products are ensured by creating an inert atmosphere inside the container, which operation is carried out in a simple manner in the sealing station.

Another advantage of the machine of the invention is that the total cutting of the sheet to prepare the already closed containers is carried out in a single cutting station and operation.

As indicated, the machine of the invention is of the type comprising a lower unwinder for an expanded polymer web reel, a preheating station for preheating the web, a container thermoforming station, an upper unwinder for a reel of a closing film for closing the shaped containers, a closing station form closing the containers, a cutting station and a drag system moving the polymer web through the different stations, keeping the web stopped while the corresponding operation is carried out in each station, making the web move, moving forwards consecutively through the different stations, each time said operations end. To that end, the different drive elements, both of the drag chain and the chain for actuating the moving elements of the different stations and unwinders are coordinated by means of the corresponding control program, all of this in a known manner.

According to the present invention, the preheating station is formed by two vertically coinciding, horizontal drawers, one of which is located above the drag system and the other under it, both drawers being assembled on a structure with the ability of vertical movement thereon by means of actuation cylinders, for bringing them closer together or separating them. These drawers carry heating means on their opposite surfaces. In this station, the web will be preheated, without contact therewith, as a step prior to the formation of the containers. The heating means will preferably be formed by infrared resistances arranged on reflecting surfaces. The preheating temperature can be suitably regulated by changing the number of activated resistances and by separating the drawers.

A table for centering the polymer sheet is arranged immediately before the preheating station, on which table the web from the lower unwinder is deposited and which leads it to the drag system. The table has transversely movable moving stops at its longitudinal edges, on which stops the longitudinal edges of the web are supported for its longitudinal centering.

In the machine of the invention, the thermoforming station is formed by a lower mold and upper countermold opposite to one another, assembled on vertically movable platforms. Both the mold and the countermold have through holes between the outer and inner surface thereof. The mold and countermold are connected through these holes to a vacuum source causing the vacuum between the web which is to be shaped and the surfaces of the mold and countermold during the shaping operation. It is thus ensured that the web is perfectly coupled and adhered to the surfaces of the mold and countermold, preventing the risk of deformations. The container is obtained in this operation generally in the form of a bottom tray. After this station, there is a loading or packaging area for arranging the product in the trays or containers, which operation can be carried out manually or automatically. After the loading area, there is the container closing station, which station comprises a lower mold, the shape of which coincides with that of the shaped containers, and an upper welding plate, the mold and plate being vertically movable by means of actuation cylinders. The polymer web with the shaped containers filled with product and the closing film from the upper winder pass superimposed between the mold and the plate. This station has means for carrying out the vacuum inside the containers and for filling them with a controlled insert gas ensuring the preservation of the contained product.

Finally, the machine comprises the cutting station, which is formed by a series of lower frames, the number and position coinciding with the containers reaching this station each time and with a contour that is the same as that of said containers, which frames are located immediately under the drag system. The station further includes an upper blade with a contour coinciding with the final contour of each container, which blade is located above the drag system and moves vertically by means of an actuation cylinder. The cutting station is completed with two or more suction pads intended to hold the containers. The suction pads are located in an inverted position above the containers and suspended from stems vertically traversing the contour defined by each blade. The cutting station includes a conveyor belt under the entire described assembly, which conveyor belt is in charge of receiving the containers that are already separated from the web.

The suction pads can move vertically between an upper position, located above the containers, to a lower position in which the containers are held, vertically transported and deposited on the conveyor belt.

The upper unwinder includes a film passage or forward movement detector and a braking device for braking said film, which can be activated by the passage detector and ensures the correct positioning of the film on the shaped containers to be closed.

The means for carrying out the vacuum of the containers and filling them with a controlled insert gas in the container closing station comprise a hood covering the upper welding plate and being able to move vertically between an upper inoperative position, in which it is separated from the mold, and a lower position in which it is supported against the mold and hermetically closes against such mold when said mold is in its upper position. The hood can be connected to a vacuum source and to a controlled inert gas supply source, allowing to successively subject the container to these two situations, in the first of which all the contaminated air contained in the container is removed, the controlled gas subsequently being injected, after which the upper welding plate will lower, pressing the web portions surrounded by the gap of the container and the upper closing film between said plate and the mold, until achieving the sealing of both components.

BRIEF DESCRIPTION OF THE DRAWINGS

All the features set forth, as well as others characteristic of the invention, will be better understood with the following description made with reference to the attached drawings, in which a non-limiting embodiment is shown.

In the drawings.

DETAILED DESCRIPTION OF AN EMBODIMENT

Figure 1:
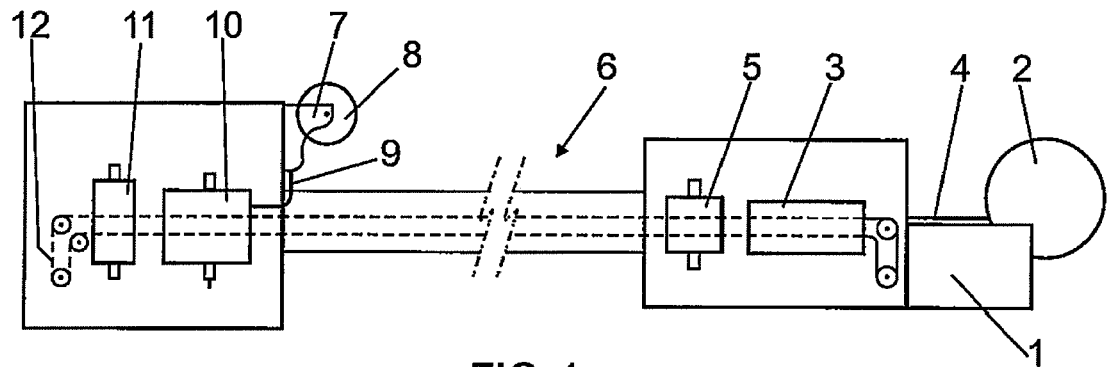
FIG. 1 shows a schematic side elevational view of a machine formed according to the invention.

FIG. 1 shows a schematic side elevational view of a machine formed according to the invention, which machine comprises a lower unwinder 1, for an expanded polymer reel 2, an expanded polystyrene reel for example, a preheating station 3 for preheating the expanded polymer web 4, a container thermoforming station 5, a loading area 6 for loading the shaped containers, an unwinder 7 for a reel 8 of a film 9 for closing the shaped containers, a container closing station 10, a container cutting station 11 and a drag system 12 for dragging the polymer web 4 through all the stations, from the inlet of the preheating station 3 to the outlet of the cutting station 11.

Figure 2:
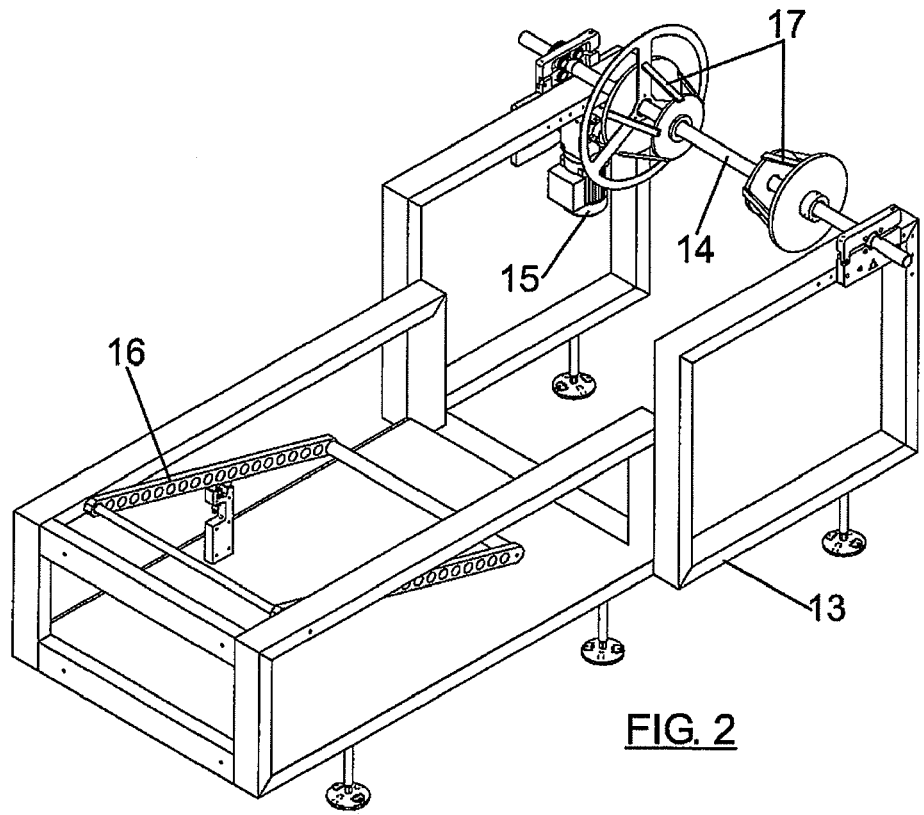
FIG. 2 shows a perspective view of the lower unwinder for the expanded polymer web reel.
Figure 3:
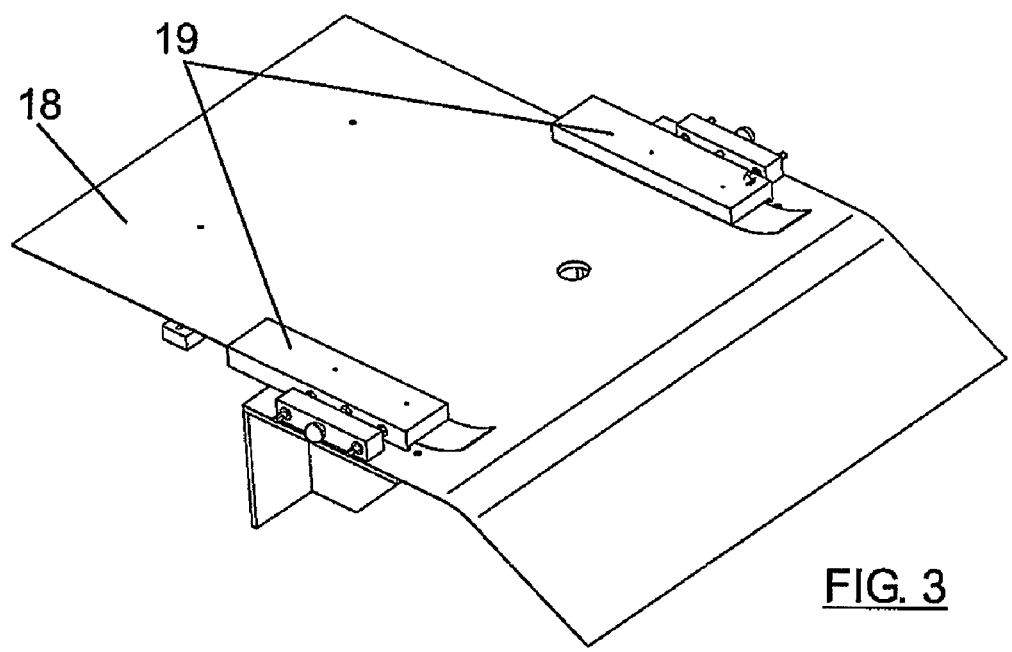
FIG. 3 shows a perspective view of the table for centering the polymer web.

FIG. 2 shows the lower unwinder, comprising a rack 13 on which there is assembled the reel-carrier shaft 14, the unwinding motor 15 and a rocker 16 which will regulate the unwinding.

The shaft 14 includes two cones 17 for centering and holding the reel.

The unwinding system is essentially formed by two elements, the motor 15 which will cause the rotation of the shaft 14, and the rocker which will ensure the tension of the unwound web. The unwinding of the web will occur intermittently as needed for the operations carried out throughout the machine.

Figure 4:
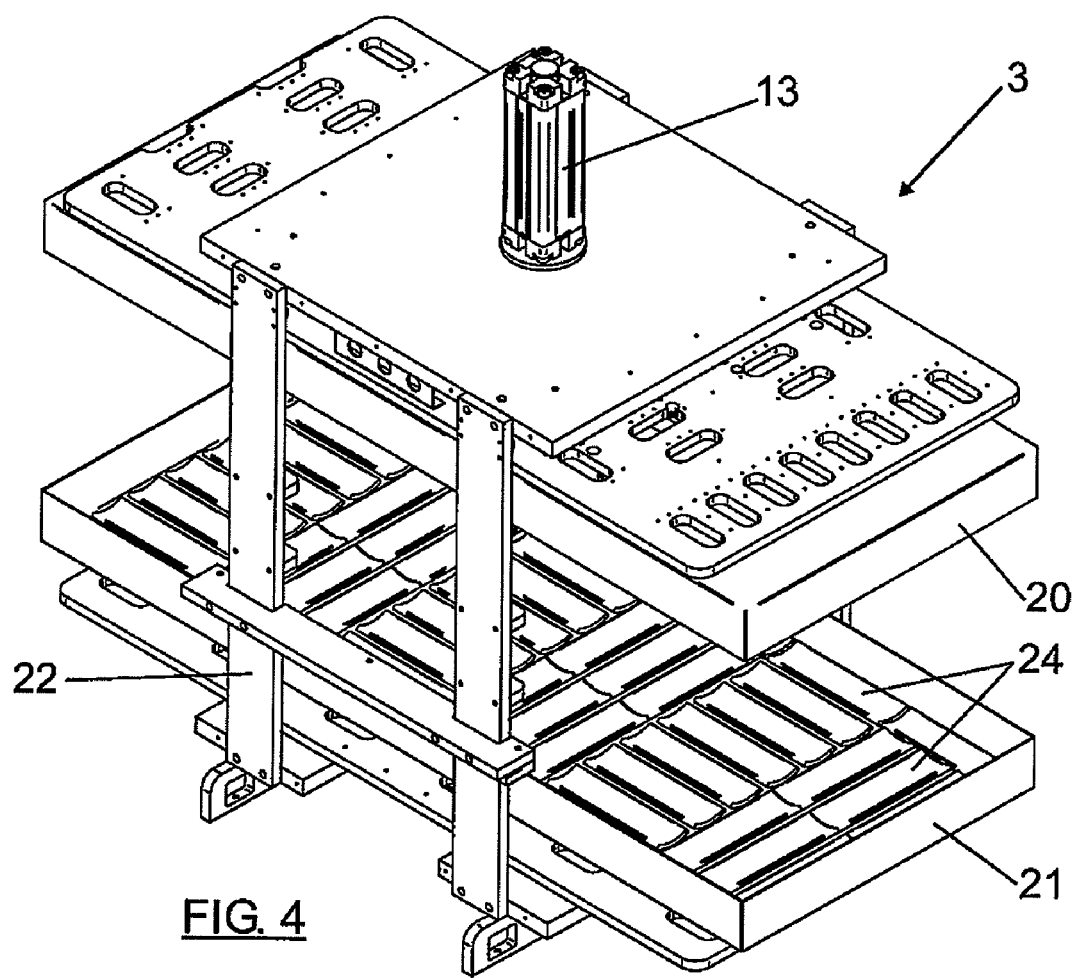
FIG. 4 shows a perspective view of the preheating station for preheating the web.

Once the web 4 is unwound, it passes through the inlet of the machine where there is a table 18 for centering said web. This table has transversely movable moving stops 19 at its longitudinal edges for centering the web. Once the web passes through this table 18, it is fixed by the chain of the drag system 14, which has links with upper pointed projections pricking the web so as to drag it, as will be described below. After the table 18 the machine includes the preheating station 3, which, as can be seen in FIG. 4, is formed by two drawers, an upper drawer 20 and a lower drawer 21 assembled on a structure 22, with the ability of vertical movement thereon by means of actuation cylinders 23. The drawer 20 is located above the drag system 12 and the drawer 21 is located under it. The drawers 20 and 21 have reflecting inner surfaces and a variable number of infrared radiation cells 24 is assembled thereon according to the forward movement passage and the width of the material to be thermoformed. The drawers 21 can be brought closer together or separated by means of the cylinders 23, for the purpose of preventing the overheating of the material and its deterioration against a possible stopping of the machine. In this station, due to the temperature reached between the drawers 20 and 21 during the normal operation phase, the sterilization of the material that may be contaminated due to different circumstances is achieved.

Figure 5:
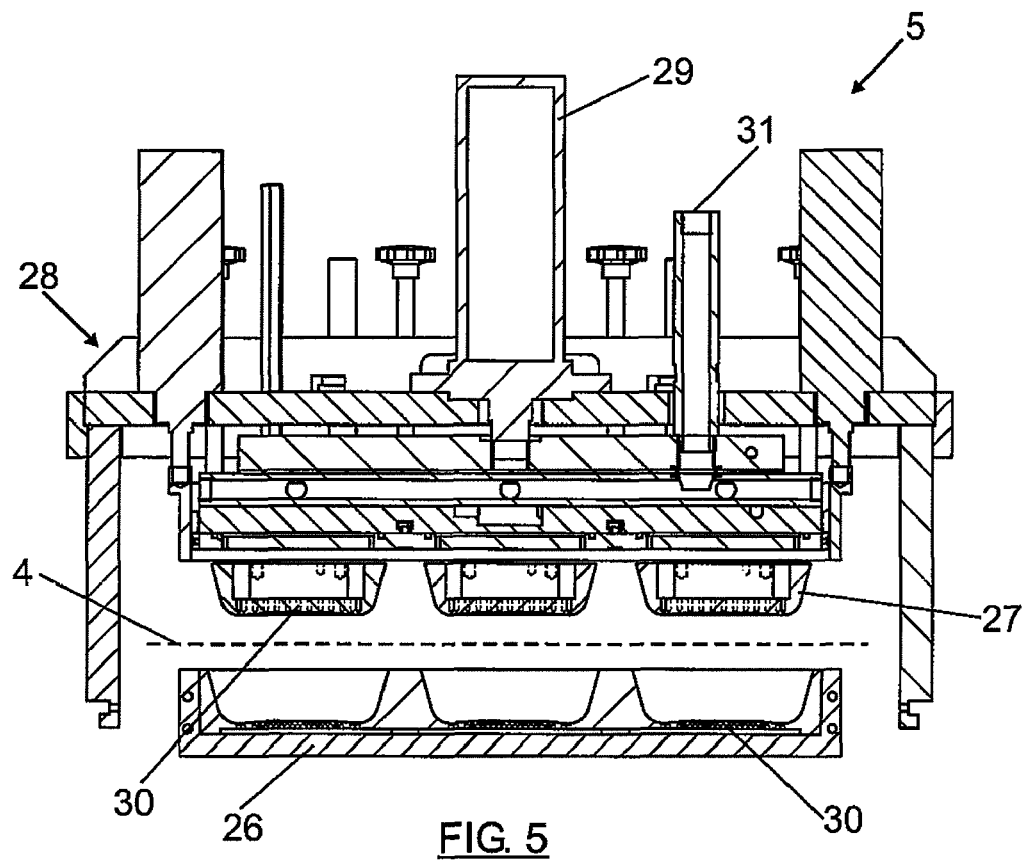
FIG. 5 shows a vertical sectional view of the container thermoforming station.

In the machine of FIG. 1, the container thermoforming station 5 is arranged after the preheating station 3, which thermoforming station, as can best be seen in FIG. 5, is formed by a lower mold 26 and an upper countermold 27 opposite to one another. FIG. 5 corresponds to a cross-section, which in the described example includes three transversely aligned molds 26 and as many countermolds 27 for thermoforming as many containers. The mold 26 and countermold 27 are assembled on vertically movable platforms, of which only the platform 28 supporting the countermold 27, which can be actuated by a pneumatic cylinder 28, is shown.

Both the mold 26 and the countermold 27 have through holes 30 communicated with a circuit through which the vacuum can be carried out. The upper platform 28 shows the assembly 31 which can be connected to a vacuum source to cause the vacuum between the web 4 being shaped and the surface of the countermold 27 and with a shape identical to the mold 30. The container is shaped in the station 5, for which the mold 26 with the shape of the tray or container to be obtained is raised. This raising movement of the mold 26 is carried out by means of a known mechanism, in the same manner as the countermold 27 has a pushing mechanism, activated by the cylinder 29, the countermolds 27 having the inner shape of the container.

Figure 6:
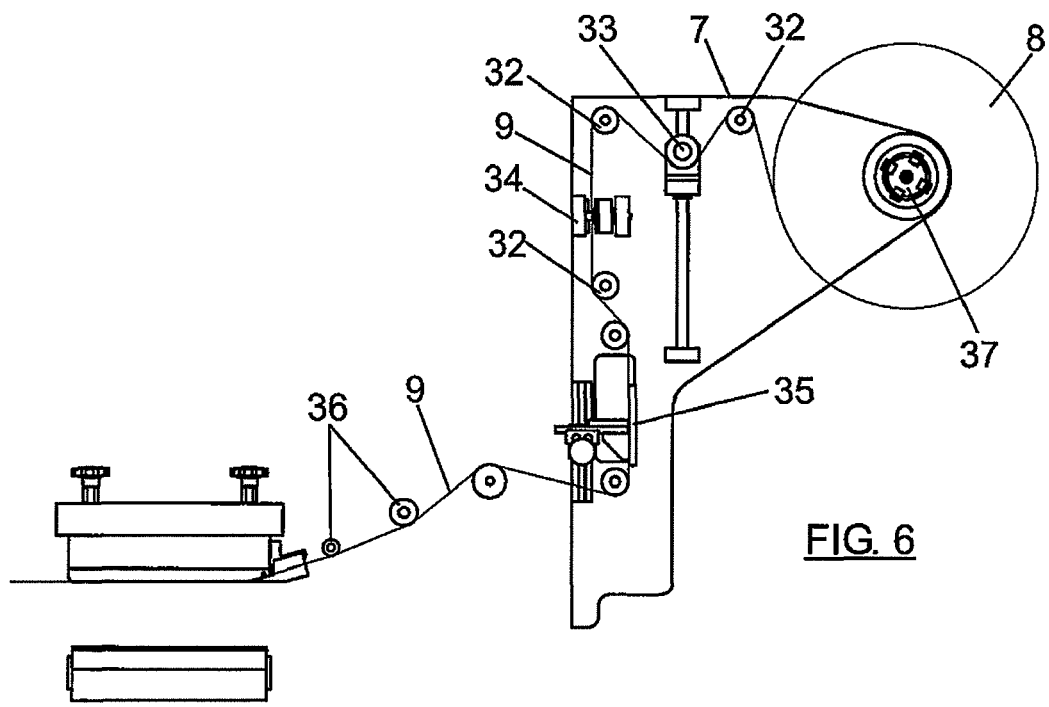
FIG. 6 shows a schematic side elevational view of the upper unwinder for the reel of the film for closing containers.

The shaping of the sheet 4 so as to obtain the trays or containers is achieved by bringing the mold and countermold closer together and activating the vacuum. After these operations, the shaped containers pass along area 6, where the product to be packaged is deposited and once the containers are filled, which containers are still being dragged by the chain, they will reach the sealing station 10, before which there is arranged the upper winder 7, the carrier for a reel 8 of a film 9 for closing the containers. FIG. 6 shows this upper unwinder 7, including a series of rollers 32 for guiding the film 9, a tensioning roller 33, a brake 34 trapping the film 4 to stop its forward movement, and a sensor 35 for reading spots or signs included in the film 9, ensuring the imprints that the film on the containers to be closed may have. FIG. 6 shows a guide device 36 for leading the film 9 to the inlet of the machine, to the welding station 10.

Figure 7:
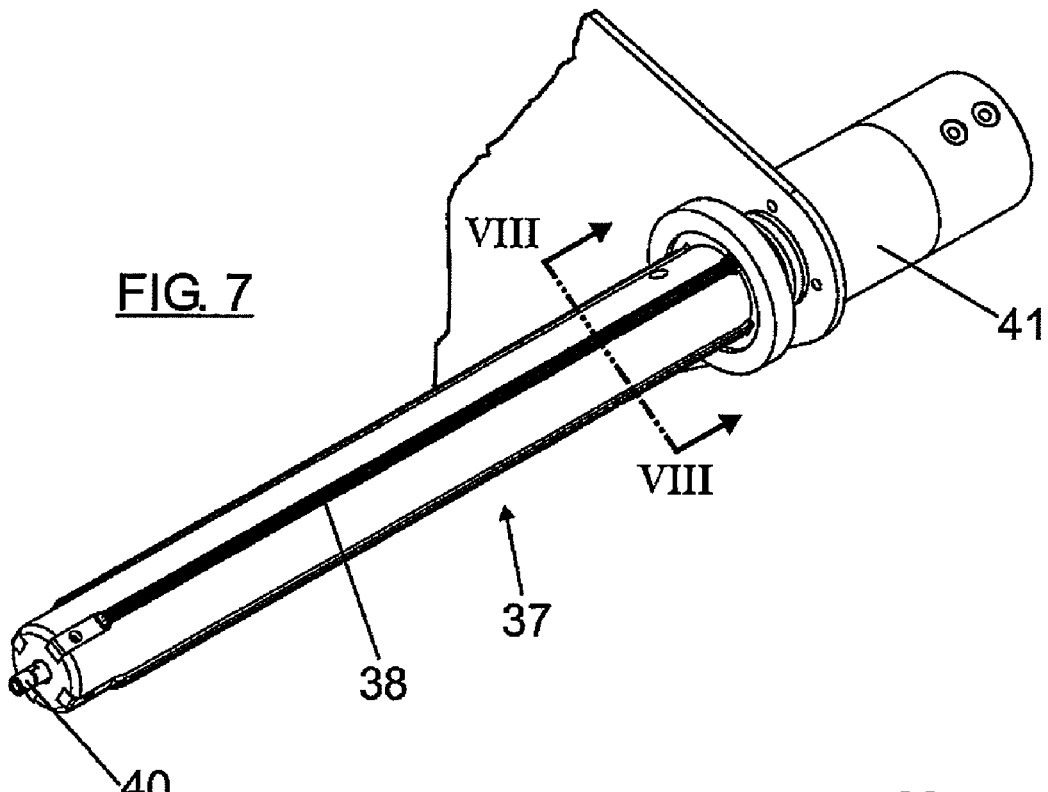
FIG. 7 shows a perspective view of the shaft of the upper unwinder.
Figure 8:
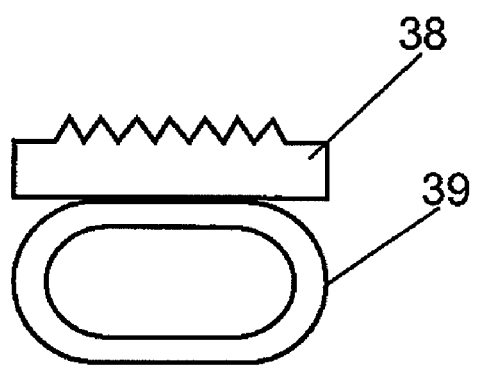
FIG. 8 shows a schematic cross-sectional view of the shaft of the upper unwinder, taken according to section line VIII-VIII of FIG. 7.

FIG. 7 shows the shaft 37 of the upper unwinder 8, which shaft has a tubular configuration and has longitudinal grooves through each of which there projects a retractable notched rod 38 which is internally supported on an inflatable pad 39, FIG. 8, housed inside shaft 37. At one end of this shaft it has a connector 40 for inflating the pad 39, whereas at the other end it is connected to an actuation motor 41.

Figure 9:
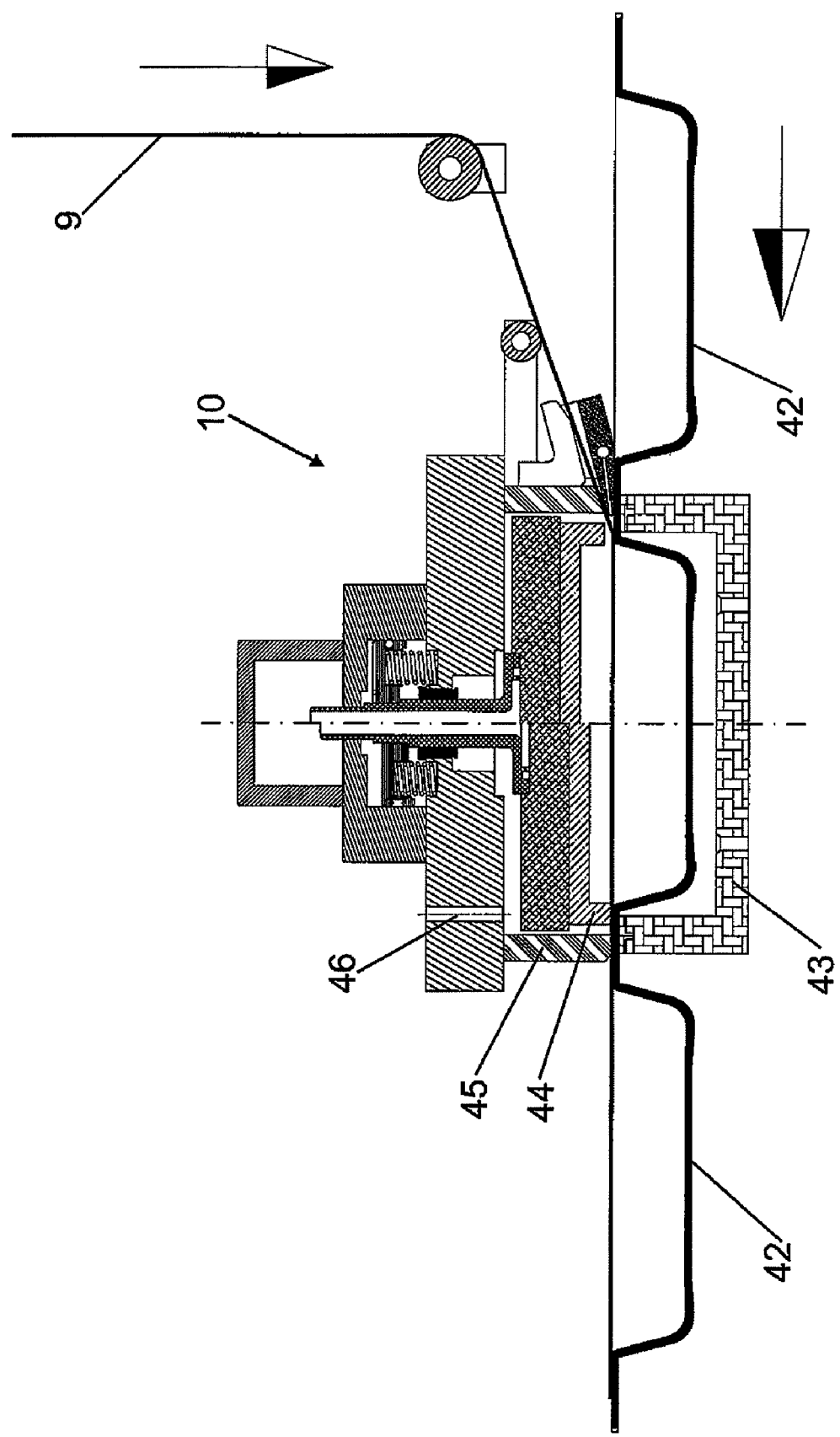
FIG. 9 shows a vertical longitudinal sectional view of the container closing station.

The film 9 is guided inside the container welding and sealing station 10, which is shown in greater detail FIG. 9. This station is in charge of welding the film 9 to the contour of the shaped containers 42 with the product to be packaged.

This closing station 10 comprises a lower mold 43, sized to house the containers 42, and an upper welding plate 44. The web 9 and the shaped containers 42 filled with the product pass superimposed between the mold 43 and the plate 44.

A vacuum is first carried out on the containers before they are closed. To that end, a countermold 45 is supported against the mold 43, which countermold hermetically closes against said mold. This countermold 45 has borehole 46 to which a vacuum source is connected, by means of which the vacuum can be carried out both inside and outside the container 43. One or several controlled insert gases are then injected through the same borehole 46 and the plate 44 is then lowered to seal the container. The countermold 45 forms a hood hermetically closing against the mold 43, with the interposition of the containers 42 and film 9. The sealing process is carried out without opening or raising the hood 45, for the purpose of not contaminating the contained gas. Once the container is sealed, the hood 45 is depressurized until reaching atmospheric pressure, and it is opened to allow the forward movement of the closed containers 45 until the following cutting station 11.

Figure 10:
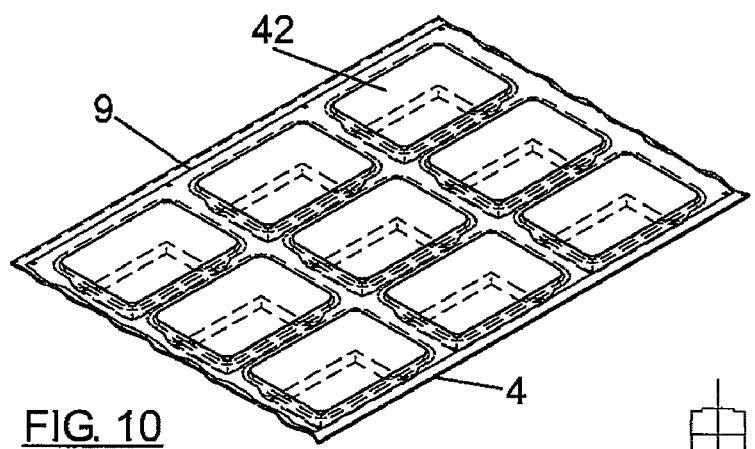
FIG. 10 shows a perspective view of a portion of the web, at the outlet of the container closing station of FIG. 9, with the containers shaped and closed.

FIG. 10 shows a portion of the web 4 with the shaped containers 43 and the film 9 positioned and sealed on said containers.

Figure 11:
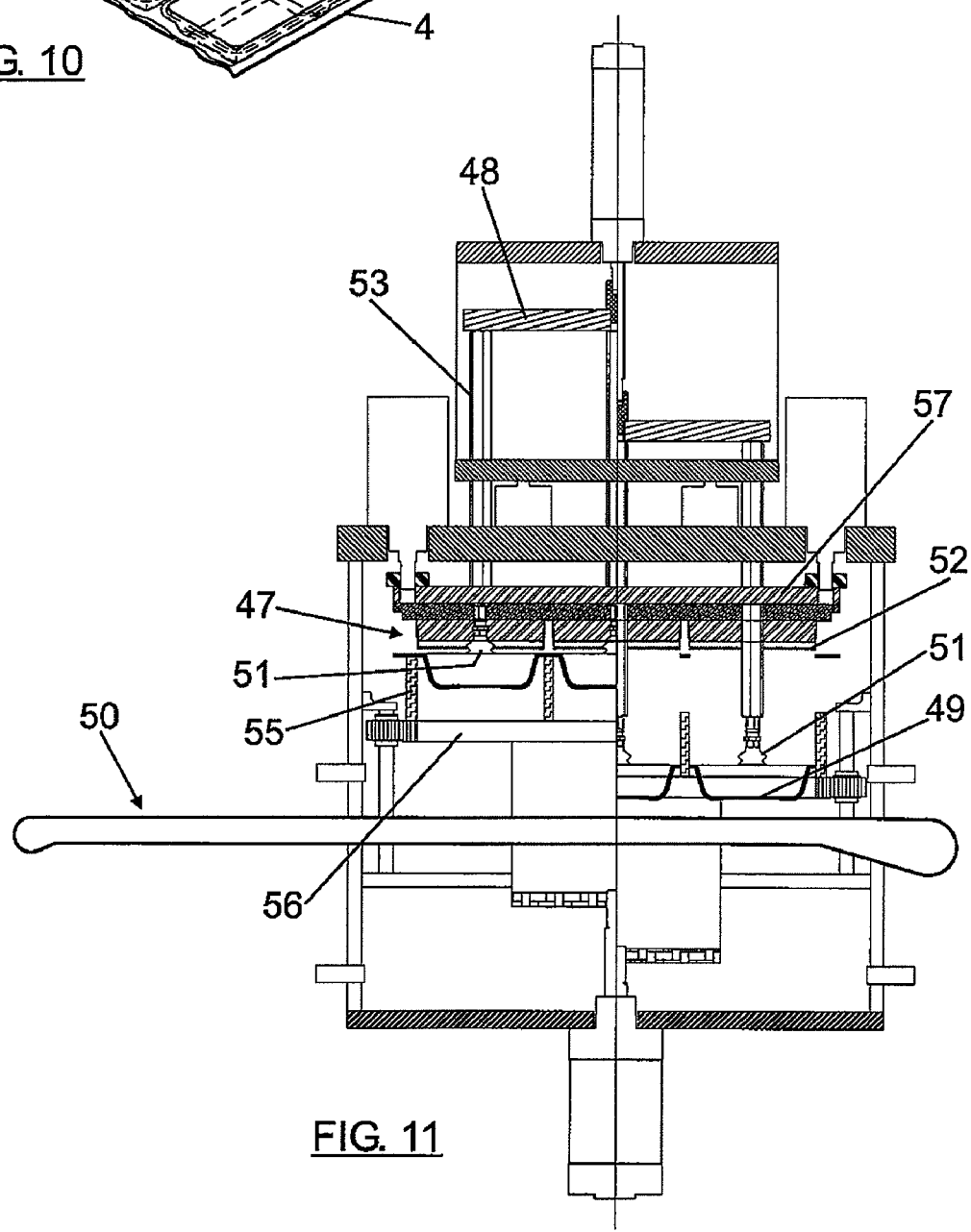
FIG. 11 shows a vertical cross-sectional view of the cutting station.

The cutting station 11, the cross-section of which is shown in FIG. 11, is formed by three subassemblies, a cutting subassembly 47, a vertical movement subassembly 48 for the cut containers 49, and an ejection table formed by the conveyor belt 50.

The process starts chronologically by means of the subassembly 48 which is formed by a series of suction pads 51 approaching the lid of the container formed by the film 9, until said containers are held. The station further includes cutting blades 52 with a contour coinciding with that of the containers to be cut. The suction pads 51 are suspended by stems 53 traversing the contours formed by the blades 52 so as to reach the lid of the containers 49.

Once the suction pads 51 are adhered to the lid of the containers 49, a lower dolly 55 supported by a moving table 56 rises until supporting the containers. The plate 57 carrying the blades 52, with the shape of the container, is then lowered by means of another upper actuation to cut the containers.

Once the containers are cut and taking into account that they are suspended by the suction pads 51, the subassembly 48 is lowered until the containers 49 are close to the belt 50, at which time the suction pads stop suctioning, the containers 49 remaining located on the belt 50 for their ejection to the outside. Both the dolly 55 and the blades 52 and the system for positioning these elements will return to the rest position, and the trays can then be ejected through the side of the machine.

After the process has concluded, it only remains to remove the excess trim from the web 4 so as to grind and reuse it.

Figure 12:
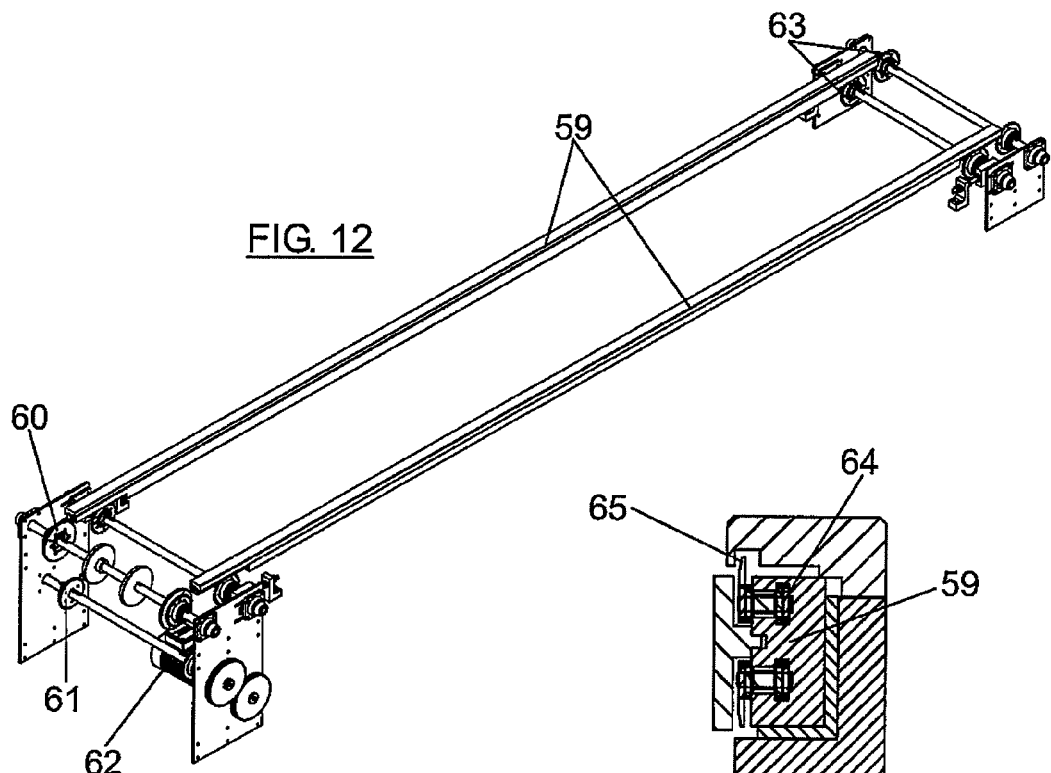
FIG. 12 shows a diagram of the drag system for dragging the expanded polymer web.
Figure 13:
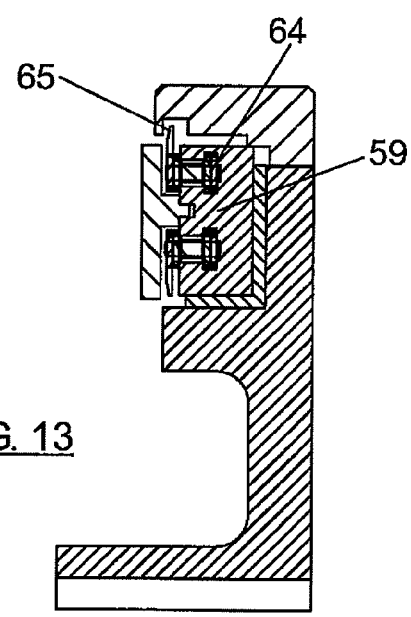
FIG. 13 shows a vertical sectional view of the drag system, taken according to section line XIII-XIII of FIG. 12.
Figure 14:
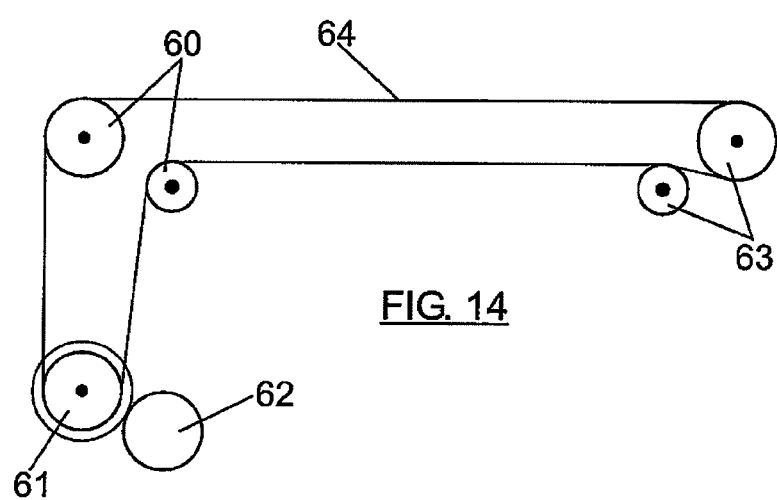
FIG. 14 shows a diagram of the path of the drag chain for dragging the expanded polymer web.

FIGS. 12 to 14 show the drag system of the expanded polymer web 4 along the different stations. This system includes two parallel chains running along guides 59 and which are led on one side by guide wheels 60 and drive wheels 61, actuated by the motor 62, whereas on the opposite side they are led by guide wheels 63.

As can be seen in FIG. 13, the drag system comprises a chain 64 the links of which have a pointed projection 65 directed in an upward direction in the forward movement section of the chain, whereas in the backward movement section it is directed in a downward direction. This pointed projection 65 is driven into and traverses the web 4 to serve as elements for pulling or dragging said web throughout the entire machine.

The invention claimed is:

1. A machine for shaping, filling and closing containers formed from an expanded polymer web, comprising:
   a lower unwinder for an expanded polymer web reel,
   a preheating station for preheating the web,
   a container thermoforming station,
   an upper unwinder for a reel of a closing film for closing shaped containers,
   a container closing station,
   a cutting station, and
   a drag system for dragging the expanded polymer web along the different stations, from an outlet of the lower unwinder to the cutting station,
   wherein the preheating station comprises two vertically coinciding, horizontal drawers, one of the drawers is located above the drag system and the other under the drag system, both drawers being assembled on a structure with the ability of vertical movement thereon by respective actuation cylinders, for bringing the drawers closer together or separating the drawers, the drawers carry heating means on their opposite surfaces; and the thermoforming station is formed by a lower mold and upper countermold opposite to one another assembled on vertically movable platforms, the mold and countermold having through holes between an outer and an inner surface, through which holes the mold and the countermold are connected to a vacuum source causing vacuum between the inner and the outer surfaces and the sheet being shaped; and the container closing station comprises a lower mold coinciding with the shape of the shaped containers and an upper welding plate, both being vertically movable by actuation cylinders, between the mold and plate the web with the shaped containers filled with the product and the closing film pass superimposed, said closing station having means for carrying out the vacuum inside the containers and for filling said containers with a controlled inert gas; and the cutting station comprises a series of lower frames, the number and position of the lower frames coincide with the containers reaching the cutting station each time and with a contour that is the same as that of said containers, the frames are located immediately under the drag system;
   an upper blade with a contour coinciding with the final contour of each container, the blade is located above the drag system and vertically movable by an actuation cylinder;
   at least two suction pads located above the containers for holding the containers, said suction pads are suspended from stems vertically traversing the contour defined by each blade; and
   a conveyor belt located under the frames, the suction pads being vertically movable between an upper position, located above the containers, and a lower position in which the containers are held, vertically transported and deposited on the conveyor belt.

2. A machine according to claim 1, wherein a table for centering the polymer web is arranged at an inlet of the drag system, on the table said web from the lower unwinder is deposited and which leads the web to the drag system, the table has transversely movable moving stops at its longitudinal edges, on the stops the longitudinal edges of the web are supported for longitudinal centering of the web.

3. A machine according to claim 1, wherein the upper unwinder for the closing film comprises an expansible reel-carrier shaft, a series of guide rollers for leading the unwound film, a film passage or forward movement detector, and a braking device for braking said film, the braking device is activated by the passage detector and ensures the correct positioning of the film on the shaped containers to be closed.

4. A machine according to claim 3, wherein the mentioned expansible shaft has a tubular configuration the shaft is supported at one end only and a wall of the shaft has one or more longitudinal grooves, through each of the grooves projects a retractable notched rod internally supported on an inflatable pad housed inside the shaft, the shaft being connected to a stack motor through the supported end.

5. A machine according to claim 1, wherein the means for carrying out the vacuum of the containers and filling with a controlled insert gas, in the container closing station, comprise a hood covering the upper welding plate and are vertically movable between an upper inoperative position, whereat the means are separated from the mold, and a lower position whereat the means are supported and hermetically closes against the mold in the upper position of said mold, the hood being connected to a vacuum source and to a controlled inert gas supply source so as to successively subject the container vacuum and inert gas to subsequently weld the film on the web around the contour of the containers by lowering of the welding plate.

6. A machine according to claim 1, wherein the expanded polymer web comprises an expanded polystyrene web.

* * * * *